United States Patent Office 3,674,627
Patented July 4, 1972

3,674,627
INSULATED ELECTRICAL CONDUCTOR
Rudolph John Angelo, Wilmington, Del., assignor to E. I. du Pont de Nemours and Company, Wilmington, Del.
No Drawing. Filed June 10, 1970, Ser. No. 45,233
Int. Cl. H01b 7/00
U.S. Cl. 161—175                              5 Claims

ABSTRACT OF THE DISCLOSURE

An insulated electrical conductor is provided having an insulation wrapping of a crystalline copolyketone film structure having the following repeating structural unit

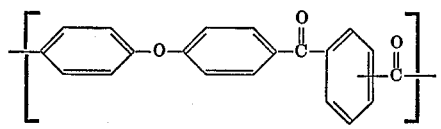

wherein the

moiety is either

 (T moiety) or 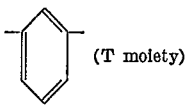 (T moiety)

and the T:I ratio varies from 90:10 to 50:50. A process is also provided whereby a copolyketone film structure having the above repeating structural unit is wrapped around an electrical conductor and thereafter subjected to two distinct heating steps to first seal the copolyketone wrapping covering and then to crystallize the copolyketone wrapping covering.

---

The present invention relates to articles of manufacture and a process or method of manufacture therefor. More particularly, the present invention is directed to an insulated electrical conductor having an insulation wrapping of copolyketone polymeric material, and to a method of manufacture for said insulated conductor.

According to the present invention, there is provided an insulated electrical conductor having an insulation wrapping of a crystalline copolyketone having the following repeating structural unit:

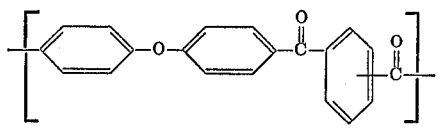 (1)

wherein the

moiety is either

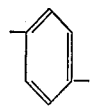 (T) or 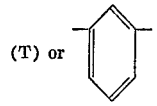

(I)

and the T:I ratio varies from 90:10 to 50:50, said copolyketone having an inherent viscosity of at least 0.75 measured at 23° C. at a concentration of 0.5% by weight in concentrated sulfuric acid. The insulation covering of copolyketone polymeric material on the electrical conductor can be of any desired thickness and is preferably at least about 0.5 mil thick, and may be of a thickness up to about 20 mils or greater.

According to the present invention, there is further provided a process or method which comprises wrapping or winding an amorphous copolyketone film structure of the following repeating structural unit:

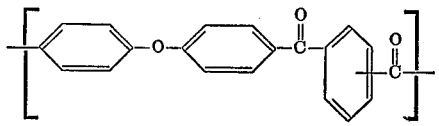

wherein the

moiety is either

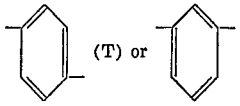 (T) or 

(I)

and the T:I ratio varies from 90:10 to 50:50, on an electrical conductor, said copolyketone having a moisture content not greater than about 0.1% by weight, based upon the total copolyketone weight, and thereafter heating said wrapped electrical conductor at a temperature of between about 425° C. and about 540° C. for a period between about five seconds and about one minute, followed thereafter by heating said wrapped electrical conductor at a temperature between about 200° C. and about 300° C. for at least about 20 seconds.

The nature and advantages of the insulated electrical conductor of the present invention will be more clearly understood from the following description thereof.

The insulated electrical conductor of the invention comprises any suitable electrical conductor such as, for example, a copper wire having an insulation covering of a crystalline copolyketone copolymeric material of Formula 1 above. The insulation covering of copolyketone polymeric material is applied to the electrical conductor by wrapping a film structure of the copolyketone therearound. The copolyketone film structure is preferably applied or wound upon the electrical conductor in tape form which may be obtained by slitting wide sheets of the copolyketone film.

The crystalline copolyketone film structure is obtained by melt-extrusion from a copolyketone composition obtained by Friedel-Crafts syntheses such as described in U.S. Pat. Nos. 3,065,205; 3,441,538 and 3,442,857 or various modifications of such syntheses listed. The copolyketone, after adequate purification for removal of catalyst residues and other impurities, is extruded into film form. The extrusion temperature will vary depending upon the T:I ratio of the copolyketone, and also with its molecular weight (or melt viscosity). Extrusion temperatures from about 10° C. to about 50° C. above the melting point of the copolyketone are satisfactory. Extrusion temperatures towards the lower end of the above range are preferred in order to minimize degradation of the copolyketone, and extrusion temperatures below 400° C. are preferred for this reason. The extrusion temperature will generally fall within the range of about 300° C. to about 400° C. The optimum extrusion temperature will vary depending upon the T:I ratio of the copolyketone, and for the range of T:I ratios under consideration, the extrusion temperature will be higher as the T:I ratio increases or becomes greater. For example, when the T:I ratio is 70:30, a preferred extrusion temperature is between about 360° C.

and about 370° C.; and when the T:I ratio is 50:50 a preferred extrusion temperature is between about 330° C. and about 350° C. The extruded copolyketone film structure is quenched against a metal roll or drum in order to preclude crystallization thereof. In such manner reproducible consistently amorphous film for use in the process of this invention is obtained. The film is preferably slit to provide tape structures which are then wound around the electrical conductor.

A salient feature of the present invention is that the copolyketone tapes employed should have a moisture content of no greater than about 0.1% by weight based upon the total copolyketone weight. If the absorbed moisture content is greater the insulation may be defective due to bubbling and blistering which may occur during the heat-sealing step. The required low moisture content can be achieved by drying or baking rolls of tape structures in an oven before winding them on the electrical conductor. Temperatures of 100° C. to 200° C. for periods of about half an hour or longer are satisfactory for this purpose. It is also possible to first wind the tape insulation onto wire and then to dry it under the foregoing conditions either as spools of wire in an oven or by passing and festooning the wire through an oven. Drying spools of tape before wrapping on electrical conductors is generally found to be more convenient.

Another salient feature of the present invention resides in the discovery that the insulation wrapping of copolyketone polymeric material must be characterized by an inherent viscosity of at least about 0.75 measured at 23° C. or a 0.5% by weight solution in concentrated sulfuric acid. Insulation wrapping of copolyketone polymeric material of inherent viscosity below about 0.75 is unsuitable because such wraping material (1) easily breaks when wound upon the conductor and (2) embrittles when annealed to crystallize the copolyketone. For these reasons, useful insulated conductors are not obtained when copolyketone polymer having an inherent viscosity of below about 0.75 is utilized.

The tapes are wound with varying amounts of overlap, generally one-half or two-thirds, so as to build up two or three layers of insulation in one wrapping. Most often two or more wraps are applied, generally with each successive tape being wrapped in the opposite "hand" or spiral to that preceding it.

In order to seal the tape wrapped insulation, the enwrapped electrical conductor is passed through an oven having an indicated temperature of between about 425° C. and about 540° C. for a period of about five seconds to one minute, preferably ten to thirty seconds. The particular oven temperature used will depend on such factors as the thickness of insulation (gauge of tape, amount of overlap, number of wraps), the gauge of the electrical conductor (since it tends to act as a heat sink, removing heat from the insulation), the speed of the electrical conductor through the oven, the oven length and so forth. It is also possible to seal one or more wraps, apply more layers, then seal again. Although infrared or radiant heaters are generally used in the oven to supply heat, other heat sources such as hot air can also be used.

Following sealing, the insulation is annealed to crystallize it, in order to achieve the improved electrical properties of the crystalline form of the copolyketone polymer. This is accomplished by heating at 200° C. to 300° C. for at least twenty seconds. Temperatures of 250° C. to 300° C. are preferred. Periods of time as long as thirty minutes have been used, but shorter times are generally used in continuous operations.

The principle and practice of the present invention will now be illustrated in the following examples which are only exemplary thereof and it is not intended that the invention be limited thereto since modifications in technique and operation will be apparent to anyone skilled in the art.

The following test and evaluation procedures was used in the examples below:

INHERENT VISCOSITY

The inherent viscosity is measured at 23° C. at a concentration of 0.5% by weight of the copolymer is concentrated sulfuirc acid. To calculate inherent viscosity, the viscosity of the polymer solution is measured relative to that of the acid alone, and calculated from the following equation:

$$\text{Inherent viscosity} = \frac{\text{natural logarithm} \frac{\text{Viscosity of solution}}{\text{Viscosity of acid solvent}}}{C}$$

where C is the concentration expressed in grams of polymer per 100 milliliters of solution.

EXAMPLE 1

Copolyketone film (prepared from diphenyl) ether and an equimolar amount of a 70:30 mixture of terephaloyl and isophthaloyl chloride in a Friedel-Crafts polymerization reaction), which was amorphous as-cast (i.e., unoriented) film approximately 1-mil thick, having an inherent viscosity of 0.95 measured on a 0.5% by weight solution in concentrated sulfuric acid, was slit into tape ⅜ in. wide.

Stranded silver-coated copper wire (38 mil diam.) was wrapped with the above tape, using a ⅔ overlap in the winding operation, and a second layer of tape was similarly wound, contralapped over the first, at a speed of 10 ft. of wire per minute. The wire was passed through two vertical ovens at the same speed. Some of the wire was passed through the ovens at 480° C. (oven temperature), and some at 540° C. In both cases the insulation was well sealed to itself. Short pieces of these wires were then heated in an oven at 275° C. for 10 minutes, and the clear insulation became opaque, which is an indication that the insulation had crystallized.

A sample of the foregoing wrapped wire was retained before the heat sealing operation. Insulation was then removed from the unsealed and the two types of sealed and annealed wires, and the densities of the insulation samples determined.

| Wire insulation: | Density, g./cc. |
|---|---|
| Unsealed | 1.270 |
| Sealed at 480° C., annealed at 275° C. | 1.284 |
| Sealed at 540° C., annealed at 275° C. | 1.286 |

As evidenced by the increased density, the insulation crystallized in the annealing operation.

EXAMPLE 2

Stranded silver-coated copper wire (38 mil diam.) was wrapped with two wraps of ⅜ in. wide tape of amorphous as-cast copolyketones (same composition as in Example 1), with a ⅔ overlap. A short length of the above wrapped wire was heated at 155° C. for two hours to thoroughly dry it. It was then heated at 140° C. for 20 seconds to heat seal it, then annealed at 275° C. for 60 seconds. The wire insulation was free of bubbles and blisters, well sealed, easily stripped from the wire, and crystalline.

EXAMPLE 3

Stranded silver-coated copper wire (38 mil diam.) was wrapped with two warps of ⅜ in. wide tape of amorphous as-cast copolyketone (same composition as in Example 1), with a ⅔ overlap. The wrapped wire was heated at 155° C. for 30 minutes to thoroughly dry it. It was then heated at 470° C. for five seconds to heat seal it, and at 275° C. for 20 seconds to anneal it. The wire insulation was free of bubbles and blisters, well sealed to itself, easily stripped from the wire, and was crystalline.

What is claimed is:

1. An article of manufacture comprising an insulated electrical conductor having a heat-sealed insulation wrapping of a crystalline copolyketone having the following repeating structural unit:

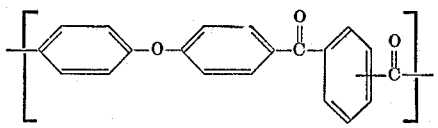

wherein the

moiety is either

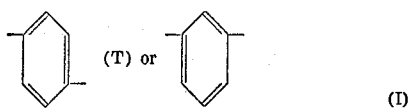

(I)

and the T:I ratio varies from 90:10 to 50:50, said copolyketone having an inherent viscosity of at least about 0.75, measured at 23° C. at a concentration of 0.5% by weight in concentrated sulfuric acid and having a moisture content not greater than about 0.1% by weight, based upon the total copolyketone weight.

2. The article of claim 1 wherein the thickness of said copolyketone insulation is at least about 0.5 mil.

3. A process which comprises wrapping on an electrical conductor an amorphous copolyketone film structure having the following repeating structural unit:

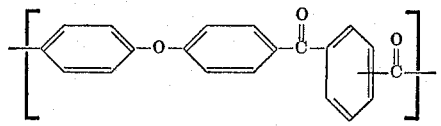

wherein the

moiety is either

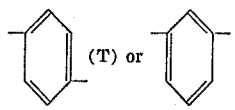

the T:I ratio varies from 90:10 to 50.:50, the copolyketone having a moisture content not greater than about 0.1% by weight, based upon the total copolyketone weight; heating said wrapped electrical conductor at a temperature of between about 425° C. and about 540° C., and thereafter heating said wrapped electrical conductor at a temperature between about 200° C. and about 300° C.

4. The process of claim 3 wherein said heating at a temperature of between about 425° C. and about 540° C. is conducted for a period between about five seconds and about one minute.

5. The process of claim 4 wherein said heating at a temperature of between about 200° C. and about 300° C. is conducted for at least about 20 seconds.

References Cited

UNITED STATES PATENTS

| | | | |
|---|---|---|---|
| 3,415,780 | 12/1968 | Holub | 117—232 |
| 3,516,966 | 6/1970 | Berr | 260—47 |
| 3,385,825 | 5/1968 | Goodman et al. | 260—78.4 |
| 3,442,857 | 5/1969 | Thornton | 260—78.4 |
| 3,546,332 | 12/1970 | Merrian et al. | 264—346 |
| 3,441,538 | 4/1969 | Marks | 260—79.3 R |
| 3,065,205 | 11/1962 | Bonner, Jr. | 260—78.4 |

ROBERT F. BURNETT, Primary Examiner

L. KOECKERT, Assistant Examiner

U.S. Cl. X.R.

117—128.4, 232; 156—185, 53; 174—110 SR

PO-1050
(5/69)

UNITED STATES PATENT OFFICE
CERTIFICATE OF CORRECTION

Patent No. 3,674,627　　　　　　　　Dated July 4, 1972

Inventor(s)　　　Rudolph John Angelo

It is certified that error appears in the above-identified patent and that said Letters Patent are hereby corrected as shown below:

Column 1, line 29, the second occurrence of "(T moiety)" should read -- (I moiety) --.
Column 4, line 19, the closing parenthesis should be removed.
Column 4, line 58, "140°C." should read -- 410°C. --.
Column 4, line 65, "warps" should read -- wraps --.
Column 6, line 3, -- (I) -- should be inserted after the second formula.

Signed and sealed this 23rd day of January 1973.

(SEAL)
Attest:

EDWARD M. FLETCHER, JR.　　　　　　　ROBERT GOTTSCHALK
Attesting Officer　　　　　　　　　　Commissioner of Patents